(12) United States Patent
Arunachalam et al.

(10) Patent No.: US 12,550,043 B2
(45) Date of Patent: Feb. 10, 2026

(54) SYSTEMS AND METHODS FOR EMERGENCY COMMUNICATIONS MANAGEMENT

(71) Applicant: T-Mobile USA, Inc., Bellevue, WA (US)

(72) Inventors: Kameswaran Arunachalam, Redmond, WA (US); Praveen Singaram Muthukumar, Lawrenceville, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 370 days.

(21) Appl. No.: 18/307,155

(22) Filed: Apr. 26, 2023

(65) Prior Publication Data

US 2024/0365210 A1   Oct. 31, 2024

(51) Int. Cl.
| | |
|---|---|
| *H04W 4/00* | (2018.01) |
| *H04L 61/5076* | (2022.01) |
| *H04L 65/1016* | (2022.01) |
| *H04W 8/26* | (2009.01) |
| *H04W 40/24* | (2009.01) |
| *H04W 4/90* | (2018.01) |

(52) U.S. Cl.
CPC ....... *H04W 40/248* (2013.01); *H04L 61/5076* (2022.05); *H04L 65/1016* (2013.01); *H04W 8/26* (2013.01); *H04W 4/90* (2018.02)

(58) Field of Classification Search
CPC ....... H04W 40/248; H04W 8/26; H04W 4/90; H04L 61/5076; H04L 65/1016
See application file for complete search history.

(56) References Cited

U.S. PATENT DOCUMENTS

2013/0331053 A1* 12/2013 Vick ...................... H04W 4/90
455/404.1
2019/0274025 A1* 9/2019 Lindholm ........... H04L 61/4557

* cited by examiner

*Primary Examiner* — Omoniyi Obayanju
(74) *Attorney, Agent, or Firm* — Lee & Hayes, P.C.

(57) ABSTRACT

The authorized IP addresses configured at components in an IMS network may become out of sync with the authorized IP address provided by a core network to UEs. This may result in emergency communications being received at the IMS network from a UE using a core network-authorized address that is not recognized by the IMS network. An IMS component may be configured to map an unauthorized address from an emergency communications to an authorized address and route the communications within the IMS network using the authorized address. An IMS component may also, or instead, add an unauthorized address from an emergency communications to a listing of authorized addresses so that the communications can be routed normally. An IMS component may also, or instead, transmit an authorized address to the UE via a policy component for configuration at the UE so that subsequent emergency communications will be authorized.

8 Claims, 9 Drawing Sheets

SYSTEMS AND METHODS FOR EMERGENCY COMMUNICATIONS MANAGEMENT

BACKGROUND

The number of wireless communications devices (e.g., user devices such as mobile telephones, smartphones, tablets, laptops, etc.) and other types of computing devices connected to the Internet has rapidly grown since the Internet's inception. Along with the growth of end user devices, the wireless networks that support them have likewise increased in size and complexity. Maintaining and upgrading such networks requires frequent adjustment and replacement of equipment and configurations.

To properly route traffic for a particular device, its address (e.g., Internet protocol (IP) address) must be authorized for routing across the various components of the network. However, with complex networks involving many components, there is a potential for an address to be recognized as authorized by some components in the network while not recognized as authorized by others. For example, a new piece of equipment may be installed that may provide to user devices IP addresses from a newly added pool of addresses that may not yet have been propagated throughout the network. Thus, a component in the network may receive and reject traffic using one of these new addresses.

While this user device address recognition mismatch may typically prove to be a minor and temporary inconvenience, for emergency communications, such as 911 calls or texts, the failure to route such communications may result in delayed emergency responder response and/or increased risk of harm to a user attempting to initiate the emergency communications. Because there may be many different network devices and functions involved in establishing and facilitating communications in a network, and because the capabilities and configurations of other devices and/or functions may not be known to all devices and functions in the network, it may be challenging to ensure that emergency communications are quickly and efficiently established in a wireless network during network modifications, such as upgrades, migrations, and equipment replacement.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
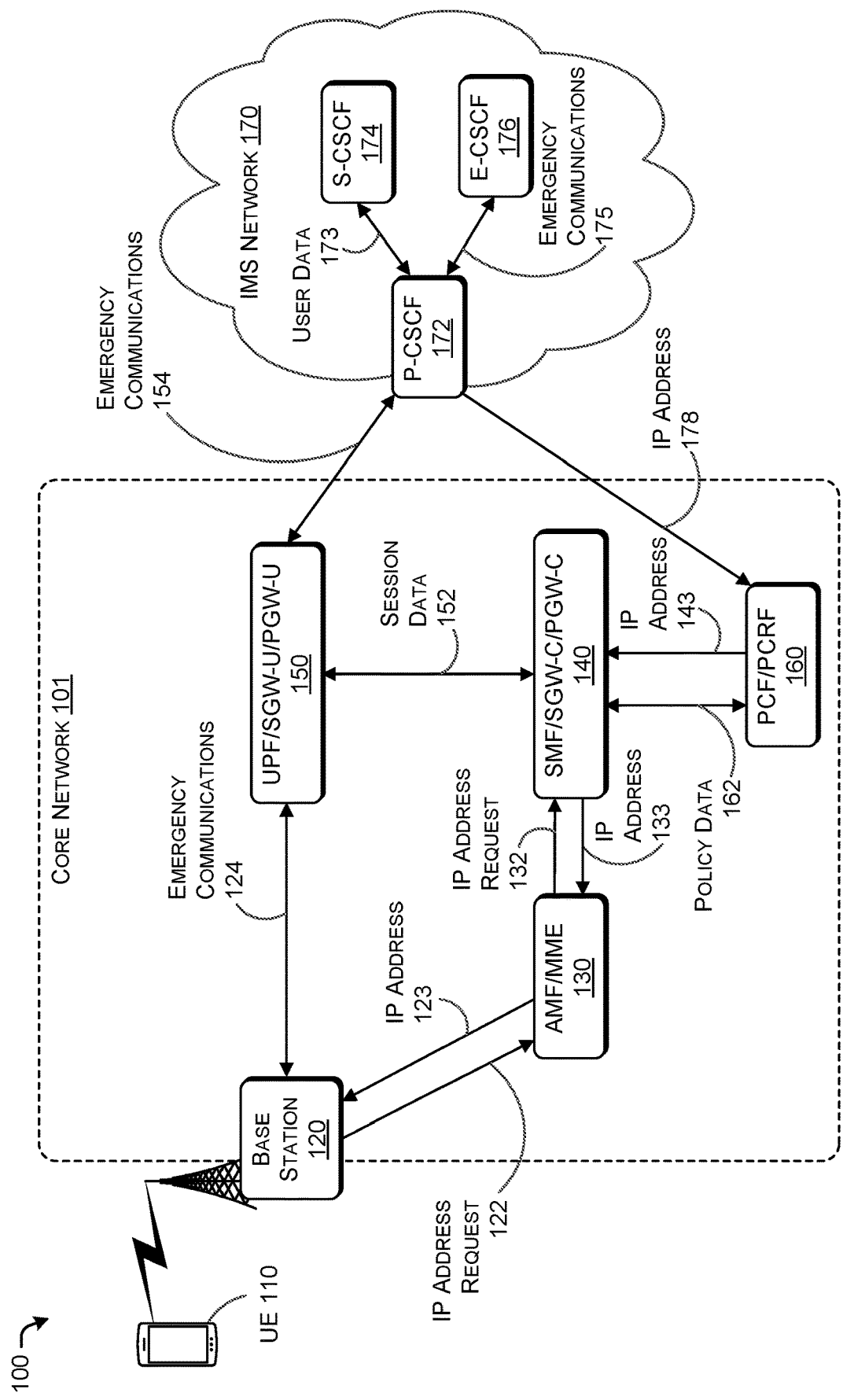
FIG. 1 is a schematic diagram of an illustrative wireless communications network environment in which systems and methods for emergency communications management in network component migration may be implemented, in accordance with examples of the disclosure.

This disclosure is directed in part to systems and techniques for performing emergency communications routing in wireless communications networks and other networks that emergency communications services. Such networks include any networks that may facilitate wireless communications services for one or more wireless communications devices. Such networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with one or more network and/or remote devices using any protocol.

In conventional systems, a wireless user device (e.g., mobile telephone, smartphone, user equipment (UE), etc.; generally referred to as "UE" herein) may wirelessly communicate with a base station (e.g., gNodeB, eNodeB, NodeB, base transceiver station (BTS), etc.) to request wireless communications services, such as a packet data communication session between the user device and a data network (e.g., the Internet, an IP multimedia system or subsystem (IMS), etc.). In examples, such a request for communications may be a request for emergency communications (e.g., request to initiate a 911 call or text). Various operations may be performed by network components, devices, and/or functions to obtain or otherwise establish the requested services for the wireless user device. Such operations may include authenticating the wireless user device and/or a user of the device, authorizing the requested services for the device and/or user, registering the device at the various systems and functions needed to provide the requested services, etc. In particular, a network operation may include determinizing or otherwise obtaining an IP address for the user device and providing that address to the user device for use in the requested communications. As used herein, a "request for communications" and a "communications request" may include, but are not limited to, any transmission of data from one device, component, or system that explicitly or implicitly indicates a request for transmission of at least a subset of that data or other data to another device, component, or system. For example, a communications request may be a packet, frame, and/or any other type of data unit transmitted from one device to another device; a request to establish a communications session of any type; a request by one device for data or any other type of response from another device; etc.

For example, a UE may transmit a request for a packet data communications session (e.g., a request to establish a protocol data unit (PDU) session or a packet data network (PDN) connection) with a data network to a base station. A communications session such as a PDU session or PDN connection, for example in an LTE or NR network, may be an end-to-end communications session between a device (e.g., the UE) and a data network (e.g., the Internet, an IMS, etc.). Such connections or sessions may be referred to generally herein as "communications session" and may include, but are not limited to, any type of PDN connection, PDU session, and any other type of packet data communications connection or session. In examples, the disclosed communications session may be an IP (e.g., IPv4 or IPv6) communications session.

The base station may relay or otherwise convey this communications session request to an access management component (e.g., an access management function (AMF) for NR networks, a mobility management entity (MME) for LTE networks, etc.) in the core of the wireless network in which the base station is configured. The access management component may interact with one or more other components to perform the operations needed to establish this communications session, such as authenticating the device and/or user, registering the UE with the network, etc. In a particular example, the access management component may interact with a session management component (e.g., a session management function (SMF) for NR networks, a serving gateway control plane function (SGW-C) and/or a packet data network gateway control plane function (PGW-C) for LTE networks, etc.) to establish the communications session and/or obtain SMF-related information to be used for communications session establishment on behalf of the UE. As part of this interaction, the access management component may request and receive, or otherwise obtain, an IP address from a session management component for the UE. The access management component may provide this address to the UE that may then use the address for communications with remote devices or systems via the wireless network.

A session management component may perform various session establishment operations, such as determining and assigning particular functions and/or components to service the session, associating policies for the session, etc. In examples, an important function performed by a session management component may be providing the access information needed by the UE to communicate with a data network using the established session, including an address (e.g., IPv4 address or IPv6 address). The session management component provides this information to the access management component for relay to the base station and ultimately to the UE requesting the communications session. In examples, the data provided to the access management component and/or the base station may include data indicating one or more user plane components (e.g., a user plane function (UPF) for NR networks, a serving gateway user plane function (SGW-U) and/or a packet data network gateway user plane function (PGW-U) for LTE networks, etc.) with which the UE, via the base station, may communicate to exchange user data with one or more destination devices and/or networks.

For example, the UE may use the provided address to transmit a request to establish a packet data communications session for exchanging user data to an indicated user plane component that may in turn provide that user data to an initial IMS network component, such as a proxy call session control function (P-CSCF). This initial IMS network component may in turn use the information accompanying the request (e.g., destination address) to route the user data to another component in the IMS network for further routing, etc., until the request reaches its intended destination. For example, a request to exchange typical user data may be transmitted from a P-CSCF to a serving CSCF (S-CSCF) for forwarding to an application server or other destination system or component. In another example, a request to exchange emergency communications data may be transmitted from a P-CSCF to an emergency CSCF (E-CSCF) for forwarding to an emergency services server or other emergency system or component. The P-CSCF may determine how to forward communications from a UE (e.g., to an S-CSCF or an E-CSCF) based on the type of request (e.g., a request to exchange emergency communications data or a request to exchange user data). Data responsive to the request may be transmitted from the destination system or component may be routed back to the UE using the UE's session management component-assigned address as the destination address using the same or similar components.

As part of its routing determination operations, a P-CSCF may (e.g., first) determine if the IP address associated with a request from a UE is an authorized address. For example, the associated IMS network may be configured to service only IP addresses from a pool of authorized or permitted IP addresses and to block all other IP addresses that may be used to access the IMS network. The P-CSCF may maintain a list, database, and/or other data structure that indicates the IP addresses and/or pools or ranges thereof that are permitted on the IMS network. These addresses may be the same or a subset of the addresses configured on the core network for provisioning to UEs. For example, ideally a session management component would provide IP addresses to UEs from a pool of addresses that are also indicated as authorized addresses at a P-CSCF.

Components and functions within a network, such as session management components, may vary and may change often due to operational circumstances (e.g., maintenance, load, upgrades, replacements, failures, etc.). For example, a particular session management component may be replaced by an upgraded session management component. Alternatively or additionally, a session management component may be added to a network, for example, to service an increased load of session requests from user devices. The IP addresses used in a core network and one or more associated IMS networks may also be expanded and/or changed from time to time. For example, a network provider may acquire another provider and may wish to configure its network to service devices using IP addresses associated with the acquired provider. Alternatively or additionally, a provider may add IP addresses to the available IP addresses serviced by its network, for example, to provide service to an increased number of user devices.

While ideally all components in a core network and any associated IMS networks would be up-to-date at all times with data indicating the set of authorized IP addresses for those networks, there is a possibility that the set of authorized IP addresses may not be synchronized across all components in such networks. For example, a new or upgraded service management component may be installed in a core network and/or configured with a (e.g., relatively) new set of authorized IP addresses. However, there may be a delay or failure in updating one or more associated IMS components, such as a P-CSCF, with this new set of authorized IP addresses. In such situations, the session management component may allocate an IP address from the new set of authorized IP addresses to a UE before the IMS network is fully configured to recognize this new set of authorized IP addresses.

The results of this failure of synchronization of IP addresses across the core and IMS networks may be a failure to establish packet data communications sessions. For example, the UE may successfully acquire session data, including an IP address and a user plane component (e.g., user plane component identifier) from a session management component. Using this IP address, the UE may transmit a request to establish a packet data communications session to a destination system or component on an associated IMS network via the user plane component. The user plane component may forward or transmit this request to a P-CSCF at the IMS network. However, the P-CSCF may not have the UE's IP address represented in its data structure indicating authorize IP addresses and may therefore reject the request or otherwise block the request.

While this may introduce some delay in accessing the destination system or component for the user of the UE, typically this will be a minor inconvenience. However, in the case of emergency communications (e.g., 911 call or text, SOS call or text, etc.), the failure to establish this communications session may result in harm or injury to a user and/or otherwise delay the response of emergency services providers.

To address this issue of potentially rejecting attempts to place emergency calls while ensuring the typical unauthorized traffic does not transit an IMS network, a P-CSCF, one or more other IMS network devices and/or components, and/or one or more core network devices and/or components may be configured to process and route emergency requests according to the systems and techniques described herein.

In various examples, a P-CSCF may override an unauthorized IP address with an authorized IP address to provide routing for emergency communications. In such examples, a P-CSCF may receive a request for communications with a destination system from a UE, where the UE's IP address as represented in the request is not included in a set of authorized IP addresses configured at or otherwise available to the P-CSCF. Based on determining that the UE's IP address is not an authorized IP address, the P-CSCF may determine a type associated with the communications request. If the type is not an emergency type, the P-CSCF may reject the request or otherwise not respond to the request.

If the determined type of the communications request is an emergency communications type or otherwise associated with an emergency, the P-CSCF may determine an IP address from its set of authorized IP addresses to use with the request. The P-CSCF may then store a mapping in a data structure mapping the unauthorized IP address associated with the UE to the determined authorized IP address. The P-CSCF may replace or otherwise substitute the determined authorized IP address in the request and forward the request to the appropriate IMS network component or function (e.g., an E-CSCF). The P-CSCF may use this stored mapping to service further emergency communications from the UE. For example, the P-CSCF may receive packets or other communications from an E-CSCF destined for the determined authorized IP address (e.g., used as the destination address). The P-CSCF may replace the determined authorized IP address with the UE's unauthorized IP address based on the stored mapping and then forward the packets or other communications to the core network for routing to the UE.

The P-CSCF may also receive one or more subsequent communications requests from the UE for which it has created a mapping. In such examples, the P-CSCF may determine the type of communications associated with such subsequent requests to determine whether to use the mapping for routing. If a subsequent communications request is not an emergency communications type, the P-CSCF may drop the request or otherwise reject the request. Alternatively, if a subsequent communications request is an emergency communications type, the P-CSCF may use the mapping to generate a corresponding request using the mapped authorized address and route appropriately.

In further examples, a P-CSCF may configure an unauthorized IP address associated with emergency communications as an authorized IP address in the IMS network. In such examples, a P-CSCF may receive a request for communications with a destination system from a UE, where the UE's IP address as represented in the request is not included in a set of authorized IP addresses configured at or otherwise available to the P-CSCF. Based on determining that the UE's IP address is not an authorized IP address, the P-CSCF may determine a type associated with the communications request. If the type is not an emergency type, the P-CSCF may reject the request or otherwise not respond to the request.

If the determined type of the communications request is an emergency type or otherwise associated with an emergency, the P-CSCF may add the unauthorized IP address associated with the UE as an authorized IP address to its set of authorized IP addresses. The P-CSCF may propagate this update of the set of authorized IP address to one or more other systems or components of the IMS network, such as an E-CSCF and/or one or more other P-CSCFs. Alternatively, the P-CSCF may serve as the initial and/or primary entry point to the IMS network for such communications and may therefore be the primary check on IP address authorization. In such cases, the update to its set of authorized IP addresses may be sufficient to allow the emergency communications to proceed using the newly authorized IP address associated with the UE. The P-CSCF may receive further emergency packets or other communications from the UE (using the formerly unauthorized and now newly authorized IP address) that it may route to the appropriate emergency system or component (or to one or more intermediate systems or components for routing to a destination emergency system or component), such as an E-CSCF. The P-CSCF may also, or instead, receive packets or other communications from an E-CSCF destined for the formerly unauthorized and now newly authorized IP address (e.g., used as the destination address). The P-CSCF may now route such communications normally because the IP address used for the UE in such communications has been configured as an authorized IP address.

To prevent abuse and access by unauthorized addresses, the P-CSCF may time out these newly added authorized addresses. For example, the P-CSCF may store a record of the time of adding an address to a set of authorized IP addresses and, after a period of time (e.g., 5 minutes, 10 minutes, an hour, etc.), may remove the IP address from the set of authorized IP addresses.

In further examples, a P-CSCF may provide an authorized IP address for configuration at a UE based on receiving emergency communications from that UE using an unauthorized IP address. In such examples, a P-CSCF may receive a request for communications with a destination system from a UE, where the UE's IP address as represented in the request is not included in a set of authorized IP addresses configured at or otherwise available to the P-CSCF. Based on determining that the UE's IP address is not an authorized IP address, the P-CSCF may determine a type associated with the communications request. If the type is not an emergency type, the P-CSCF may reject the request or otherwise not respond to the request.

If the determined type of the communications request is an emergency type or otherwise associated with an emergency, the P-CSCF may determine an authorized IP address for the UE from its set of authorized IP addresses. The P-CSCF may transmit this authorized IP address to the UE via the core network for configuration and use by the UE. For instance, the P-CSCF may provide the IP address to a core network policy component (e.g., a policy control function (PCF) for NR networks, a policy and charging rules function (PCRF) in LTE networks, etc.) that may then provide the IP address to a session management component in the core network. The session management component may adjust the session configurations for the UE to use the IP address provided by the P-CSCF. This may include instructing the UE to use this alternative IP address and/or updating any one or more other components or systems with the new IP address. The UE may then retransmit the initial emergency communications that triggered the P-CSCF to determine the new IP address for the UE. Because the UE is now using this authorized IP address provided by the P-CSCF, the P-CSCF may route such communications to the appropriate emergency system or component (or to one or more intermediate systems or components for routing to a destination emergency system or component), such as an E-CSCF. The P-CSCF may also, or instead, receive packets or other communications from an E-CSCF destined for the UE that now use an authorized IP address as the destination address for the UE. The P-CSCF may now route such communications normally because the IP address being used for the UE is an authorized IP address.

By facilitating the use of IP addresses that may not be authorized for emergency communications to ensure such communications are successful, the systems and methods described herein provide more efficient emergency communications session establishment operations and reduced resource utilization, while ensuring that communications with emergency services providers are reliably established. By minimizing the likelihood of repeatedly attempting to establish an emergency communications session for a UE based on mismatched sets of authorized IP addresses between a core network and an IMS network, the systems and methods described herein can improve the performance and increase the efficiency of both network and user resources. For example, the methods and systems described herein may be more efficient and/or more robust than conventional techniques, as they may increase the speed of the emergency communication session establishment process and reduce the wasting of resources on repeated attempts to establish emergency communications sessions after failed attempts using IP addresses not recognized as authorized in an IMS network. That is, the methods and systems described herein provide a technological improvement over existing emergency communications session establishment systems and processes by facilitating improved session establishment and increasing network efficiency by reducing the traffic associated with failed attempts to communicate using IP addresses not recognized as authorized in an IMS network. In addition to improving the efficiency of network and device resource utilization, the systems and methods described herein can provide more robust systems by, for example, making more efficient use of network devices by reducing unnecessary and/or unproductive device and network signaling and processing associated with attempting to communicate using IP addresses not recognized as authorized in an IMS network, thereby freeing network and device resources for more productive operations. Moreover, the systems and methods described herein can ensure that a user receives the attention needed from providers of emergency services without undue delay due to unsynchronized authorized IP addresses across a core network and an IMS network.

Illustrative environments, signal flows, and techniques for implementing systems and methods for emergency communications management are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a UE 110 that may wirelessly communicate with a base station 120. The base station 120 may be any type of base station, including, but not limited to, any type of BTS, NodeB, eNodeB, gNodeB, etc. The base station 120 may communicate with other components and functions in a core network 101. The core network 101 may be any one or more networks that facilitate communications between particular devices, components, and/or functions of various types in the core of a wireless communications network that may facilitate communication between computing devices and/or mobile devices (e.g., UEs). Various connections between components and functions in the core network 101 may be wired, wireless, or a combination thereof. The components and functions described herein may be implemented as physical devices, as software components and/or functions executing on one or more computing devices, and as any combination thereof. In various embodiments, the core network 101 may facilitate the establishment of communications sessions for one or more wireless devices, such as UE 110. In examples, the core network 101 may facilitate authorized packet-based communications between such wireless devices and other wireless devices, devices on the Internet, one or more IMSs, and/or one or more other data networks (DNS). For example, the core network 101 may facilitate packet-based (e.g., IP) communications between the UE 110 and an IMS network 170 that may be any one or more IMS networks.

In FIG. 1, connections between components may be logical and/or communications connections that may be facilitated by one or more wired and/or wireless connections and may include traversal of one or more devices, components, and/or functions that may or may not be shown in FIG. 1.

In environment 100, the UE 110 may communicate with the base station 120 to request the establishment of a communications session (e.g., to communicate with one or more systems at the IMS network 170, such as a PDN connection or a PDU session). For example, the UE 110 may, as part of or inherent in requesting the establishment of a communication session, request an IP address for use in communicating with the IMS network 170. The base station 120 may relay the IP address request or otherwise transmit an IP address request 122 an AMF/MME 130, which may be any type of access management component as described herein. The IP address request 122 may be a network access request that provides information that the AMF/MME 130 may use to determine and/or obtain an IP address for the UE 110, such as an indication of the base station 120's tracking area code (TAC) and/or an indication of the UE 110's PDN-Type, which may have been provided by the UE 110 in the request to establish the communications session. For example, the US 110's PDN-Type may indicate that the UE is requesting an IPV4 address, an IPV6 address, or one of either an IPV4 address or an IPV6 address.

In various examples, the AMF/MME 130 may perform one or more operations to establish a communications session for the UE 110. For example, the AMF/MME 130 may perform or initiate operations to authenticate and authorize the UE 110 and/or a user associated with the UE 110, create contexts for a session, determine and apply session policies, establish user plane resources, etc. In examples, the AMF/MME 130 may determine a session management component, such as SMF/SGW-C/PGW-C 140, for performing session management operations based on the UE 110, the base station 120, and/or the request PDN-Type. The AMF/MME 130 may transmit and/or forward an IP address request 132 based on the IP address request 122 to the SMF/SGW-C/PGW-C 140 requesting an IP address (e.g., among other session data) for the UE 110.

The SMF/SGW-C/PGW-C 140 may respond to the request 132 with a responsive message transmitted to the AMF/MME 130 that may include an IP address 133. This responsive message may further include other information, such as user plane data for use by the UE 110 (e.g., an indication of a user plane component, such as UPF/SGW-U/PGW-U 150). The SMF/SGW-C/PGW-C 140 may determine or obtain the IP address 133 from a set of authorized IP addresses, for example, configured at the SMF/SGW-C/PGW-C 140. The SMF/SGW-C/PGW-C 140 may further determine policy data for the requested communications session and/or perform other operations to establish session data via interactions with one or more other components of the core network 101. For example, the SMF/SGW-C/PGW-C 140 may exchange policy data 162 with a policy component, such as PCF/PCRF 160 to determine session data for the requested communications session for the UE 110. The SMF/SGW-C/PGW-C 140 may further exchange session data 152 with the UPF/SGW-U/PGW-U 150 to establish session resources for the UE 110's user data at the UPF/SGW-U/PGW-U 150.

The AMF/MME 130 may provide the IP address 123 (e.g., based on, or the same as, the IP address 133) to the base station 120 for configuration at the UE 110 for use in the requested communications session. The AMF/MME 130 may further provide other data for use by the base station 120 and/or UE 110 for the communications session, such as an address or indication for the UPF/SGW-U/PGW-U 150.

Having received an IP address and session information, the UE 110 may now attempt to establish a packet communications session with a remote system or component. For example, the UE 110 may transmit an emergency communications message to the base station 120, which may recognize such communications as user data. The base station 120 may transmit this data as emergency communications 124 to the UPF/SGW-U/PGW-U 150. Based on emergency communications 124, the UPF/SGW-U/PGW-U 150 may transmit and/or relay emergency communications 154 to the IMS network 170. In examples, the UPF/SGW-U/PGW-U 150 may transmit the emergency communications 154 to the P-CSCF 172.

The P-CSCF 172 may process received communications to determine whether such communications have originated at an authorized system, device, and/or address. For example, the P-CSCF 172 may be configured with a set or list of authorized IP addresses that are permitted access to the IMS network 170. If a received communications is associated with one of these authorized IP addresses, the P-CSCF 172 may then determine an appropriate call session control function to which to forward the communications and/or an appropriate destination for such communications. For example, if the P-CSCF 172 receives "normal" (e.g., non-emergency) data from an authorized IP address, the P-CSCF 172 may forward or otherwise transmit such data as user data 173 to an S-CSCF 174 for further processing and/or routing. If the P-CSCF 172 receives an emergency message or emergency data from an authorized IP address, the P-CSCF 172 may forward or otherwise transmit such data as emergency communications 175 to an E-CSCF 176 for further processing and/or routing.

However, if the P-CSCF 172 receives data or a communications from a non-authorized IP address (or from a non-authorized device, system, or component), the P-CSCF 172 may not route or forward that data or communications. For example, if the received communications is associated with an IP address that is not included in the set of authorized IP addresses stored or obtained by the P-CSCF 172 representing the addresses that are permitted access to the IMS network 170, the P-CSCF 172 may reject that communications (e.g., drop the associated packet and/or transmit a responsive message indicating a denial of access to the IMS network 170). While this prevents unauthorized use of the resources of the IMS network 170, this denial of access may not be desirable if received communications is associated with an emergency.

In examples, the IP address 123 provided to the base station 120 for use by the UE 110 (e.g., based on the IP address 133 provided by the SMF/SGW-C/PGW-C 140) may be determined based on a set of authorized IP addresses stored or obtained by the SMF/SGW-C/PGW-C 140 that have not (e.g., yet) been configured at the P-CSCF 172. Thus, the emergency communications 154 provided to the P-CSCF 172 by the UPF/SGW-U/PGW-U 150 and based on the emergency communications 124 may be rejected by the P-CSCF 172.

To address this authorized IP address mismatch between the core network 101 and the IMS network 170 so that the emergency communications 154 are provided access to the IMS network 170, in various examples, the P-CSCF 172 may override the IP address 123 with an authorized IP address to provide routing for the emergency communications 154. As described in more detail herein, based on determining that the emergency communications 154 is of an emergency type or otherwise associated with emergency communication, the P-CSCF 172 may determine an IP address from its recognized set of authorized IP addresses to use with for the emergency communications 154. The P-CSCF 172 may generate and/or update a data structure mapping the IP address 123 used by the UE 110 to this determined authorized IP address. The P-CSCF 172 may replace or otherwise substitute the determined authorized IP address in the emergency communications 154 and forward the communications to the E-CSCF 176. The P-CSCF 172 may use this mapping (e.g., data structure representing such mapping) to process further emergency communications received from the UE 110 and/or destined for the UE 110. For example, the P-CSCF 172 may receive packets or other communications from the E-CSCF 176 destined for the determined authorized IP address that is mapped to the IP address 123 used by the UE 110. The P-CSCF 172 may replace the determined authorized IP address with the UE 110's IP address 123 based on the stored mapping and then forward the packets or other communications to the core network 101 (e.g., to the UPF/SGW-U/PGW-U 150) for routing to the UE 110.

Alternatively or additionally, to address an authorized IP address mismatch between the core network 101 and the IMS network 170 so that the emergency communications 154 are provided access to the IMS network 170, the P-CSCF 172 may configure the UE 110's IP address 123 associated with emergency communications 154 as an authorized IP address at the P-CSCF 172. As described in more detail herein, the P-CSCF 172 may add the IP address 123 as an authorized IP address to its set of authorized IP addresses. The P-CSCF 172 may propagate the IP address 123 as an authorized IP address to one or more other systems or components of the IMS network 170, such as the E-CSCF 176 and/or one or more other P-CSCFs. Alternatively, because the P-CSCF 172 may serve as the initial and/or primary entry point to the IMS network 170 for such communications and may therefore be configured to verify IP addresses on behalf of other components of the IMS network 170. Based on this updated set of authorized IP addresses, the P-CSCF 172 may route, process, and/or otherwise allow access to IMS network 170 for further emergency packets or other communications from and/or destined for the UE 110 using the IP address 123.

Alternatively or additionally, to address an authorized IP address mismatch between the core network 101 and the IMS network 170 so that the emergency communications 154 are provided access to the IMS network 170, the P-CSCF 172 may provide an authorized IP address for configuration at the UE 110 based on receiving the emergency communications 154 using the IP address 123 that is not recognized as authorized by the P-CSCF 172. As described in more detail herein, the P-CSCF 172 may determine an authorized IP address for the UE 110 from its set of authorized IP addresses. The P-CSCF 172 may transmit this authorized IP address as IP address 178 to a policy component, such as the PCF/PCRF 160 at the core network 101. The PCF/PCRF 160 may provide the IP address 143 (based on the IP address 178) to the SMF/SGW-C/PGW-C 140. The SMF/SGW-C/PGW-C 140 may adjust the session configurations for the UE 110 to use the IP address 143 provided by the PCF/PCRF 160 and based on the IP address 178. This may include The SMF/SGW-C/PGW-C 140 transmitting instructions to the UE 110 via the AMF/MME 130 and/or the base station 120 to use this alternative IP address and/or update any one or more other components or systems with the new IP address. The UE 110 may then retransmit the emergency communications 124 that previously triggered the P-CSCF 172 to determine the new IP address 178 for the UE. Because the UE 110 is now using an IP address recognized as authorized by the provided by the P-CSCF 172, the P-CSCF 172 may route such communications 154 to the E-CSCF 176 as emergency communications 175. The P-CSCF 172 may also, or instead, route packets and other communications normally for the UE 110 using the IP address 178 because the IP address 178 is recognized as an authorized IP address by the P-CSCF 172.

Illustrative Functions and Communications

Figure 2:
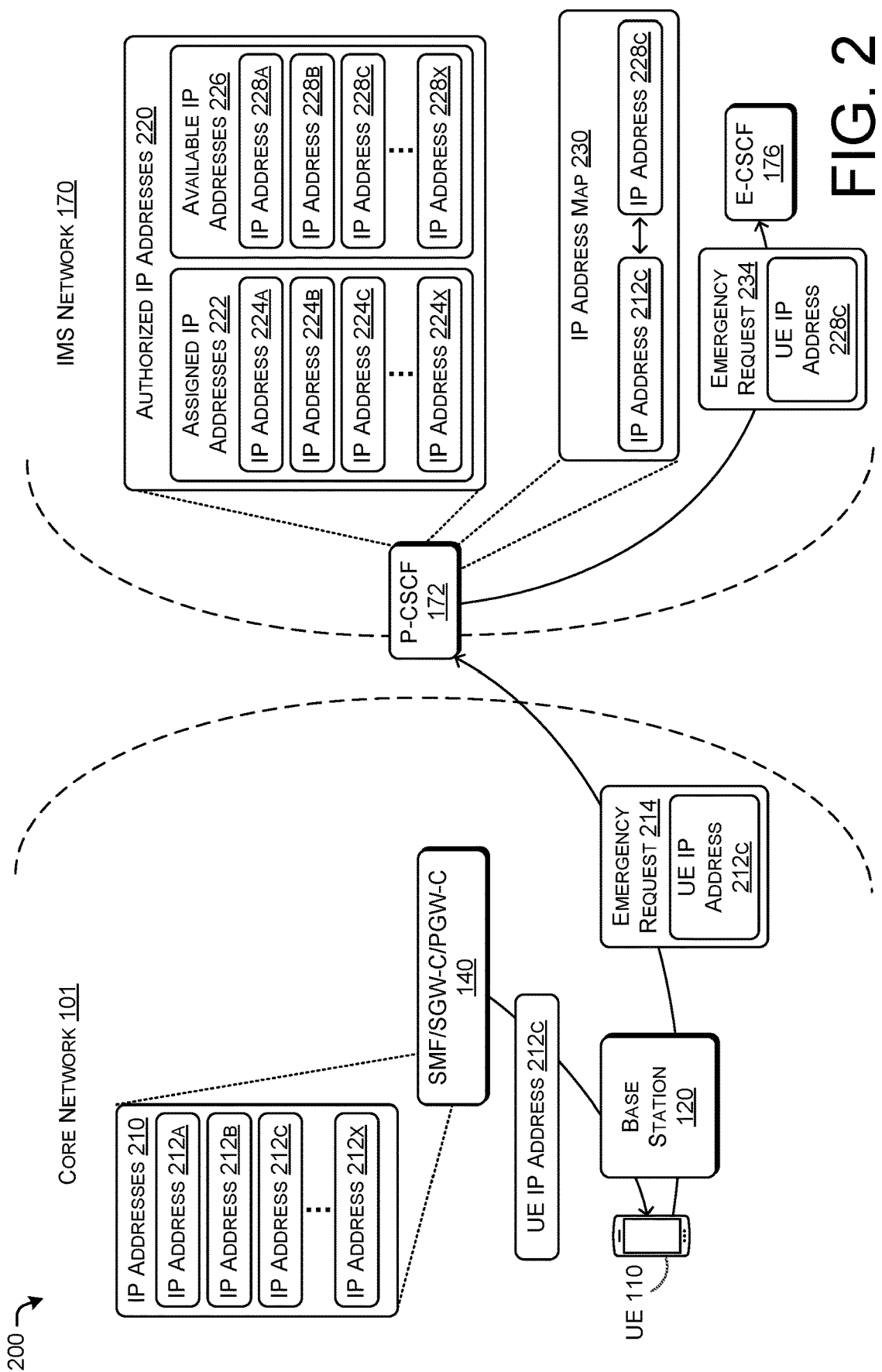
FIG. 2 is a schematic diagram of illustrative functions and communications that may be implemented in a wireless communications network in which systems and methods for emergency communications management in network component migration may be implemented, in accordance with examples of the disclosure.
Figure 3:
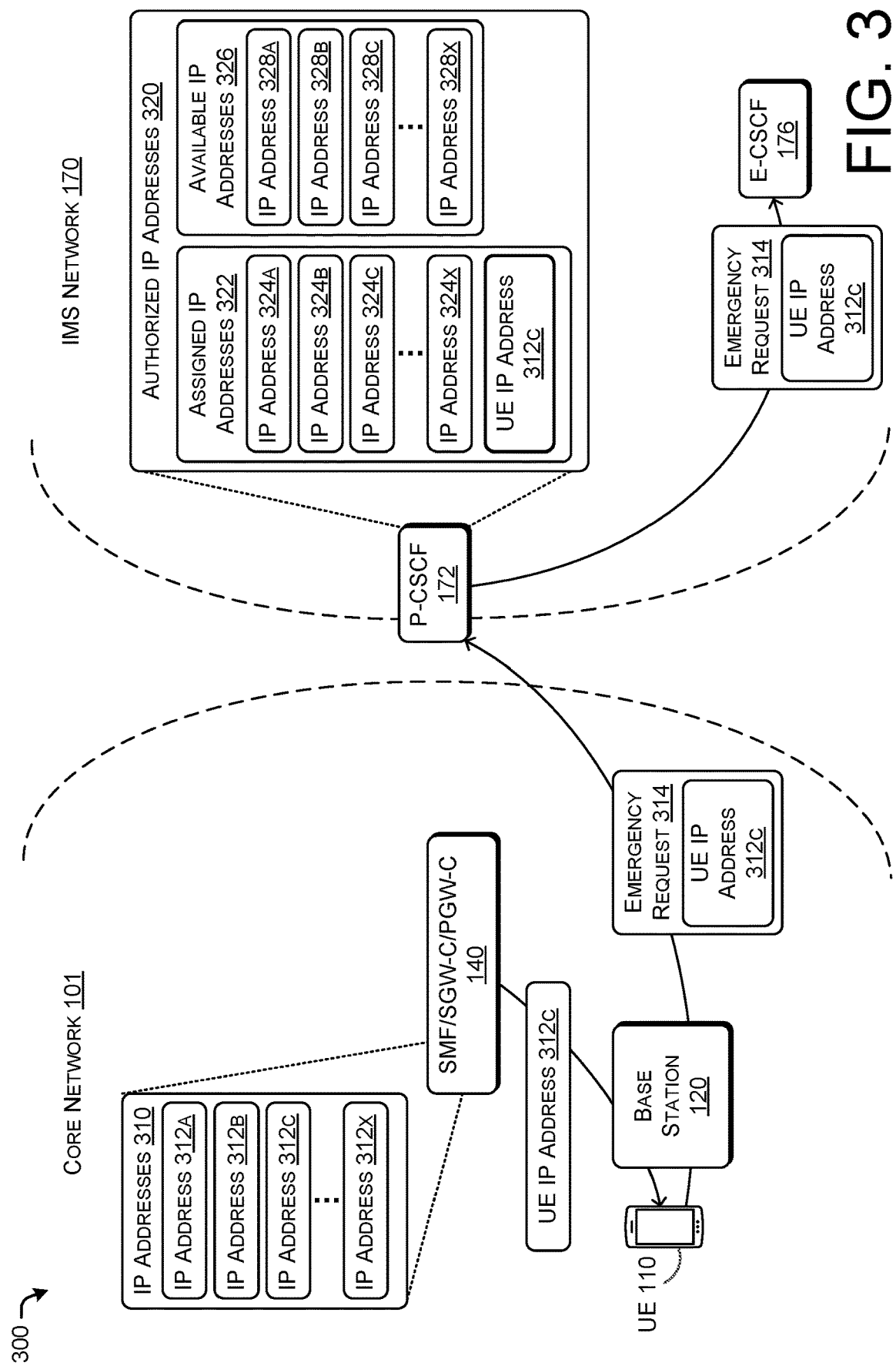
FIG. 3 is a schematic diagram of illustrative functions and communications that may be implemented in a wireless communications network in which systems and methods for emergency communications management in network component migration may be implemented, in accordance with examples of the disclosure.
Figure 4:
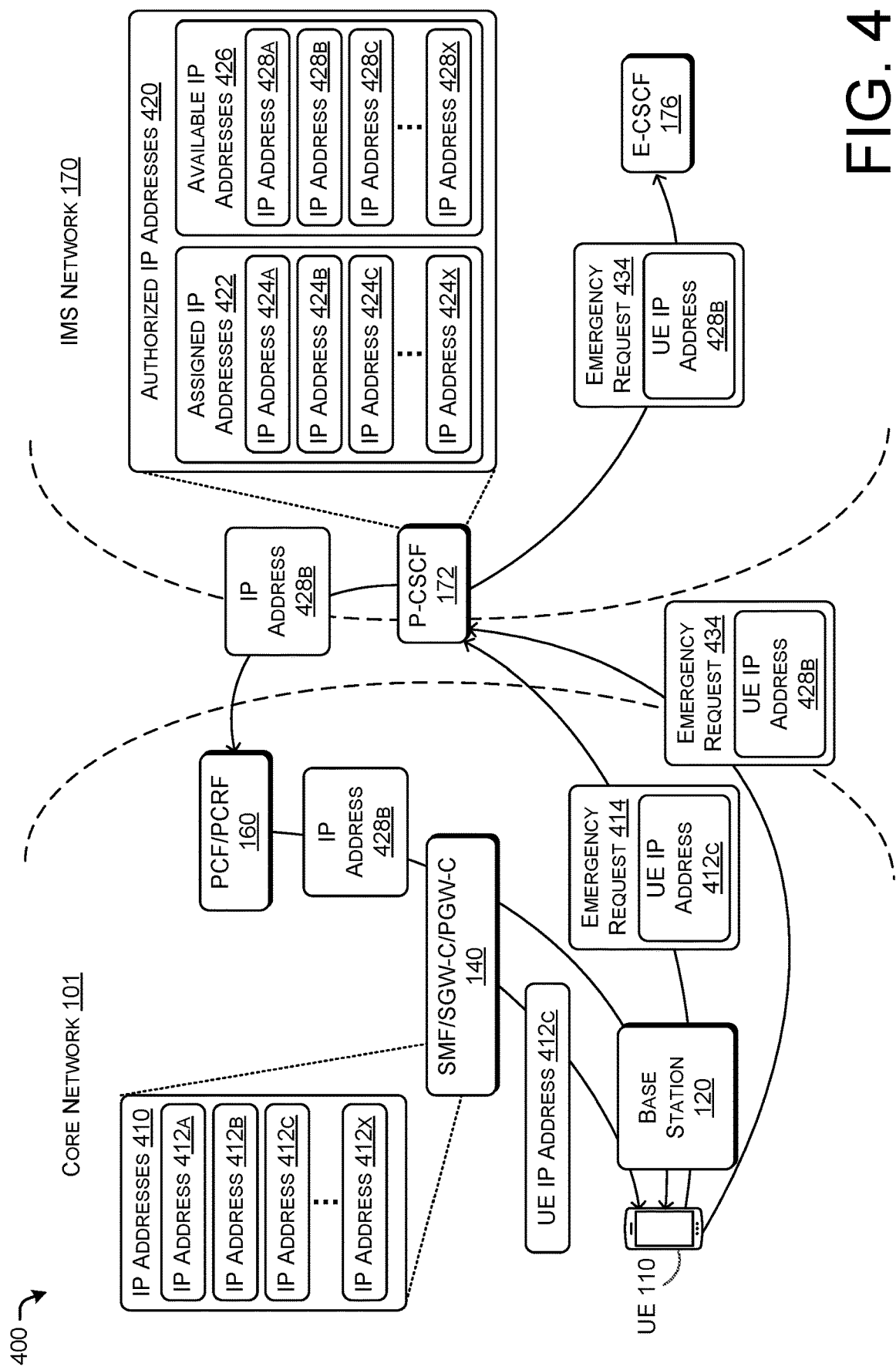
FIG. 4 is a schematic diagram of illustrative functions and communications that may be implemented in a wireless communications network in which systems and methods for emergency communications management in network component migration may be implemented, in accordance with examples of the disclosure.

FIGS. 2-4 illustrate schematic diagrams of exemplary functions and communications of various messages that may be exchanged in one or more of the disclosed systems and techniques for emergency communications management as described herein. Reference may be made in this description of the exemplary functions and communications to devices, messages, functions, components, and/or operations illustrated in FIG. 1 and described in regard to that figure. However, the functions and communications illustrated in FIGS. 2-4 and described herein may be implemented in any suitable system and/or with any one or more suitable devices and/or entities. Moreover, any of the functions and communications described in regard to FIGS. 2-4 may be used separately and/or in conjunction with other functions and communications and/or implemented using devices, systems, and or operations. All such embodiments are contemplated as within the scope of the instant disclosure.

FIG. 2 illustrates schematic diagram 200 that may represent a subset of the functions and components represented in environment 100 of FIG. 1. In this example, the SMF/SGW-C/PGW-C 140 may be configured with, or may otherwise determine or obtain, a set of authorized IP addresses 210 that may include IP addresses 212*a* . . . *x*. Included in session establishment and management operations, the SMF/SGW-C/PGW-C 140 may determine a UE IP address 212*c* from the set of authorized IP addresses 210 and provide that address to the base station 120 for configuration at the UE 110. The UE 110 may be configured with this address and initiate an emergency communications request 214 that includes the UE IP address 212*c* (e.g., as a source address). The emergency communications request 214 may be transmitted, relayed, and/or otherwise provided to the P-CSCF 172 via one or more other components (not shown), including, but not limited to, as described herein.

The P-CSCF 172 may be configured with, or may otherwise determine or obtain, a set of authorized IP addresses 220 that may include assigned IP addresses 222 (including IP addresses 224*a* . . . *x*) that may be assigned to one or more user devices and available IP addresses 226 (including IP addresses 228*a* . . . *x*) that may be available for assignment to one or more user devices. For various reasons as described herein, the set of authorized IP addresses 220 may not fully match or otherwise correspond to the set of authorized IP addresses 210.

In response to receiving the emergency communications request 214, the P-CSCF 172 may verify that the request 214 is an emergency communications. The P-CSCF 172 may then determine that the UE IP address 212*c* is not included in the set of authorized IP addresses 220. In examples, the P-CSCF 172 may override the UE IP address 212*c* with an authorized IP address to provide routing for emergency communications. For example, the P-CSCF 172 may determine an IP address 228*c* from among the available IP addresses 226 in the set of authorized IP addresses 220 to use for the emergency communications request 214 and/or other emergency communications associated with the UE 110 and/or the UE IP address 212*c*. The P-CSCF 172 may then generate and/or update an IP address map 230 with a mapping of the UE IP address 212*c* to the IP address 228*c*. The P-CSCF 172 may replace the UE IP address 212*c* in the emergency request 214 with the IP address 228*c* to generate the emergency communications request 234. The P-CSCF 172 may then transmit the emergency communications request 234 to the E-CSCF 176 for emergency communications processing. The P-CSCF 172 may also use the IP address map 230 to provide service for further emergency communications associated with the UE 110 and/or the UE IP address 212*c*. For example, the P-CSCF 172 may receive packets or other communications from the E-CSCF 176 destined for the IP address 228*c*. The P-CSCF 172 may replace the IP address 228*c* with the UE IP address 212*c* based on the IP address map 230 and then forward the packets or other communications to the core network for routing to the UE. The P-CSCF 172 may further use the IP address map 230 to generate communications using the IP address 228*c* based on further emergency communications received from the UE 110 that use the UE IP address 212*c*.

FIG. 3 illustrates schematic diagram 300 that may represent a subset of the functions and components represented in environment 100 of FIG. 1. In this example, the SMF/SGW-C/PGW-C 140 may be configured with, or may otherwise determine or obtain, a set of authorized IP addresses 310 that may include IP addresses 312*a* . . . *x*. Included in session establishment and management operations, the SMF/SGW-C/PGW-C 140 may determine a UE IP address 312*c* from the set of authorized IP addresses 310 and provide that address to the base station 120 for configuration at the UE 110. The UE 110 may be configured with this address and initiate an emergency communications request 314 that includes the UE IP address 312*c* (e.g., as a source address). The emergency communications request 314 may be transmitted, relayed, and/or otherwise provided to the P-CSCF 172 via one or more other components (not shown), including, but not limited to, as described herein.

The P-CSCF 172 may be configured with, or may otherwise determine or obtain, a set of authorized IP addresses 320. Authorized IP addresses 320 may include assigned IP addresses 322 (including IP addresses 324*a* . . . *x*) that may be assigned to one or more user devices and available IP addresses 326 (including IP addresses 328*a* . . . *x*) that may be available for assignment to one or more user devices. For various reasons as described herein, the set of authorized IP addresses 320 may not fully match or otherwise correspond to the set of authorized IP addresses 310.

In response to receiving the emergency communications request 314, the P-CSCF 172 may verify that the request 314 is an emergency communications. The P-CSCF 172 may then determine that the UE IP address 312*c* is not included in the set of authorized IP addresses 320. In examples, the P-CSCF 172 may add the UE IP address 312*c* to the set of authorized IP addresses 320, for example to the assigned IP addresses 322. In some examples, the P-CSCF 172 may propagate this update to the one or more other components of the IMS network 170, such as the E-CSCF 176, while in other examples, the P-CSCF 172 may not propagate this update because it may serve as the authorization component for the IMS network 170.

The P-CSCF 172 may then forward the emergency communications request 314 with the UE IP address 312*c* to the E-CSCF 176 for emergency communications processing. Because the UE IP address 312*c* has now been added to the set of authorized IP addresses 320, the P-CSCF 172 may route and/or process emergency communications associated with the UE 110 and/or the UE IP address 312*c* normally (e.g., normal emergency communications routing and/or processing). For example, the P-CSCF 172 may receive packets or other communications from the E-CSCF 176 destined for the UE IP address 312*c* and may route those communications bask to the UE 110 via the core network 101 based on the UE IP address 312*c*. The P-CSCF 172 may further process and/or route subsequent emergency communications from the UE 110 using the UE IP address 312*c* based on determining that the UE IP address 312*c* is included in the set of authorized IP addresses 320.

FIG. 4 illustrates schematic diagram 400 that may represent a subset of the functions and components represented in environment 100 of FIG. 1. In this example, the SMF/SGW-C/PGW-C 140 may be configured with, or may otherwise determine or obtain, a set of authorized IP addresses 410 that may include IP addresses 412*a* . . . *x*. As part of the session establishment and management operations performed for the UE 110, the SMF/SGW-C/PGW-C 140 may determine a UE IP address 412*c* from the set of authorized IP addresses 410 and provide that address to the base station 120 for configuration at the UE 110. The UE 110 may be configured with this address 412*c* and initiate an emergency communications request 414 that includes the UE IP address 412*c* (e.g., as a source address). The emergency communications request 414 may be transmitted, relayed, and/or otherwise provided to the P-CSCF 172 via one or more other components (not shown), including, but not limited to, as described herein.

The P-CSCF 172 may be configured with, or may otherwise determine or obtain, a set of authorized IP addresses 420. Authorized IP addresses 420 may include assigned IP addresses 422 (including IP addresses 424*a* . . . *x*) that may be assigned to one or more user devices and available IP addresses 426 (including IP addresses 428*a* . . . *x*) that may be available for assignment to one or more user devices. For various reasons as described herein, the set of authorized IP addresses 420 may not fully match or otherwise correspond to the set of authorized IP addresses 410.

In response to receiving the emergency communications request 414, the P-CSCF 172 may verify that the request 414 is an emergency communications. The P-CSCF 172 may then determine that the UE IP address 412*c* is not included in the set of authorized IP addresses 420. In examples, based on this determination, the P-CSCF 172 may determine an authorized IP address 428*b* from among the available IP addresses 426 in the set of authorized IP addresses 420. The P-CSCF 172 may then transmit the IP address 428*b* to the core network 101 for configuration at the UE 110. For example, the P-CSCF 172 may transmit the IP address 428*b* to the PCF/PCRF 160 (or other policy component) for transmission to the SMF/SGW-C/PGW-C 140. The SMF/SGW-C/PGW-C 140 may then transmit the IP address 428*b* to the base station 120 for configuration at the UE 110. The UE 110 may then reconfigure to use the IP address 428*b* (e.g. instead of the UE IP address 412*c*). The UE 110 may then generate another emergency communications request 434 using the updated UE IP address 428*c*.

The P-CSCF 172 may receive the emergency communications request 434 using the updated UE IP address 428*c* and, because it recognizes the UE IP address 428*c* as an authorized address, may forward the emergency communications request 434 with the UE IP address 312*c* to the E-CSCF 176 for emergency communications processing. The P-CSCF 172 may route and/or process emergency communications associated with the UE 110 and/or the UE IP address 428*b* normally (e.g., normal emergency communications routing and/or processing). For example, the P-CSCF 172 may receive packets or other communications from the E-CSCF 176 destined for the UE IP address 428*b* and may route those communications bask to the UE 110 via the core network 101 based on the UE IP address 428*b*. The P-CSCF 172 may further process and/or route subsequent emergency communications from the UE 110 using the UE IP address 428*b* based on determining that the UE IP address 428*b* is included in the set of authorized IP addresses 320.

Illustrative Operations

Figure 5:
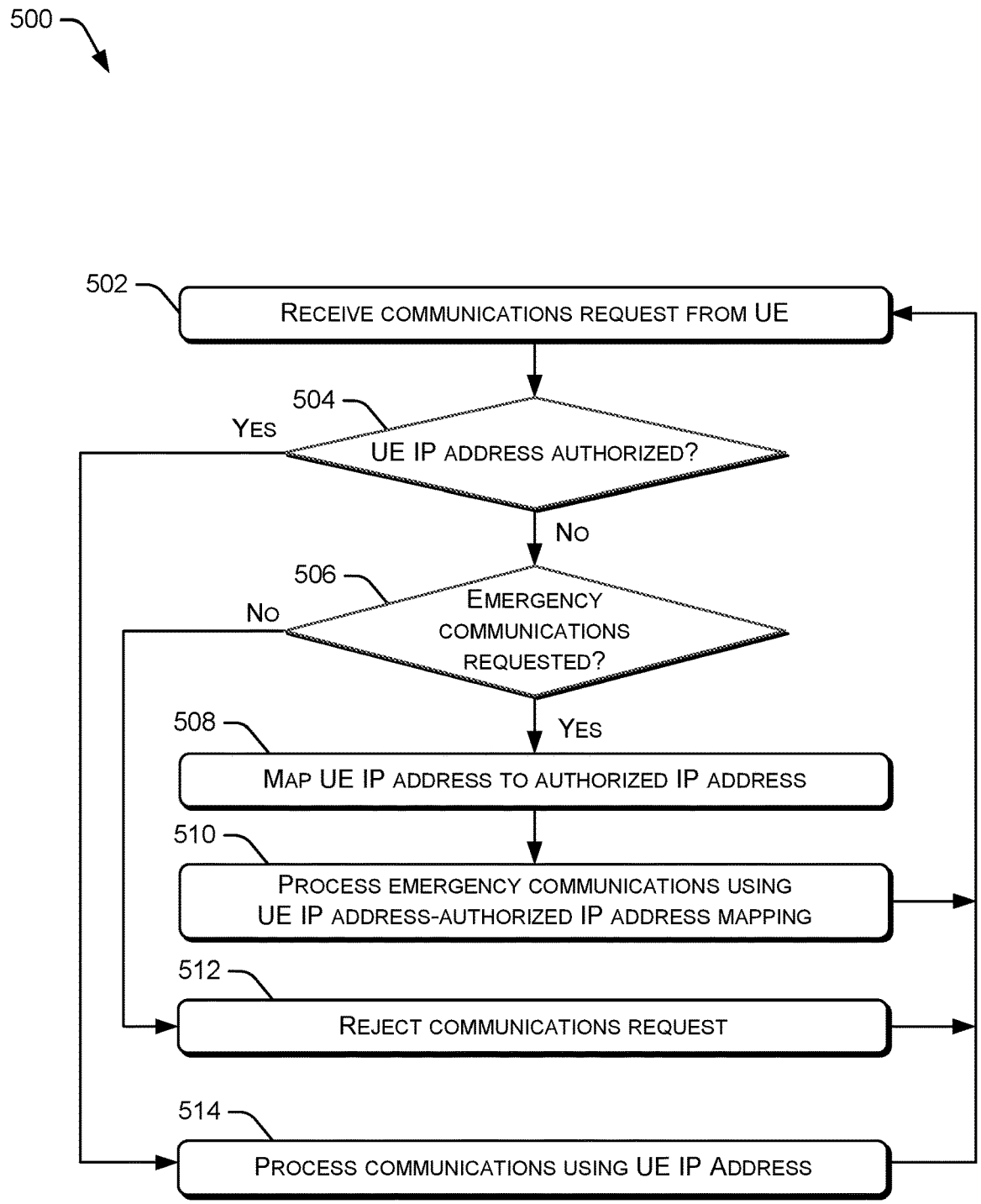
FIG. 5 is a flow diagram of an illustrative process for performing emergency communications management, in accordance with examples of the disclosure.

FIG. 5 shows a flow diagram of an illustrative process 500 for emergency communications management according to the disclosed embodiments. The process 500 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 500 may be described with reference to the wireless network environment 100 of FIG. 1, however, other environments may also be used.

At operation 502, a communications request may be received from a UE via a core network at an IMS network component, such as a P-CSCF. This communications request may be a request to establish a packet communication session between the UE and a destination system or components in the IMS network. The communications request may include an IP address (e.g., IPv4 or IPV6). Alternatively, the communications received at operation 502 may be any other type of packet-based communications that may use any other type of address. The communications received at operation 502 may further include an indication of a communications and/or communications session type.

At operation 504, the IMS network component may determine whether the IP address associated with the communications received at operation 502 is an authorized IP address. For example, the IMS network component may be configured with a set of authorized IP addresses. This set of authorized IP addresses may or may not correspond to a set of authorized IP addresses used at the core network to provide an IP address to the UE originating the communications received at operation 502. If the IP address is authorized, the process 500 may proceed to operation 514 where the IMS network component may process and/or route the communications normally (e.g., as normal user data, as emergency communications, etc.) using the IP address associated with the communications received at operation 502. The process 500 may return to operation 502 to process additional communications.

If, at operation 504, the IMS network component determines that the IP address associated with the communications received at operation 502 is not an authorized IP address, at operation 506 the IMS network component may determine whether the received communications is an emergency communications request or otherwise associated with an emergency (e.g., SOS, 911 call or text, etc.). If the communications is not an emergency communications, at operation 512 the request or communications may be rejected. For example, the packet may simply be dropped, a response with an error code may be generated and transmitted, etc. The process 500 may return to operation 502 to process additional communications.

However, if the IMS network component determines that the received communications is an emergency communications at operation 506, at operation 508 the IMS network component may map the unauthorized IP address associated with the request to an authorized IP address and store a record of such mapping (e.g., in a data structure representing IP address mapping data).

At operation 510, the IMS network component may then override the unauthorized IP address with the authorized IP address determined at operation 508 by generating a new communications (e.g. packet) and/or modifying the communications to use the determined authorized IP address. The IMS network component may then transmit this updated communications with the authorized IP address as appropriate, for example, to an appropriate E-CSCF. The IMS network component may use the IP address mapping to service further emergency communications associated with the IP address associated with the communications received at operation 502. For example, the IMS network component may receive packets or other communications from an E-CSCF destined for the determined authorized IP address and may use the IP address mapping to replace the determined authorized IP address with the unauthorized IP address associated with the communications received at operation 502 and then forward the packets or other communications to the core network for routing to the UE. The IMS network component may also, or instead, use the IP address mapping to overwrite the IP address of subsequent emergency communications using the unauthorized IP address associated with the communications received at operation 502 so that communications with emergency services providers may be facilitated. The process 500 may return to operation 502 to process additional communications.

Figure 6:
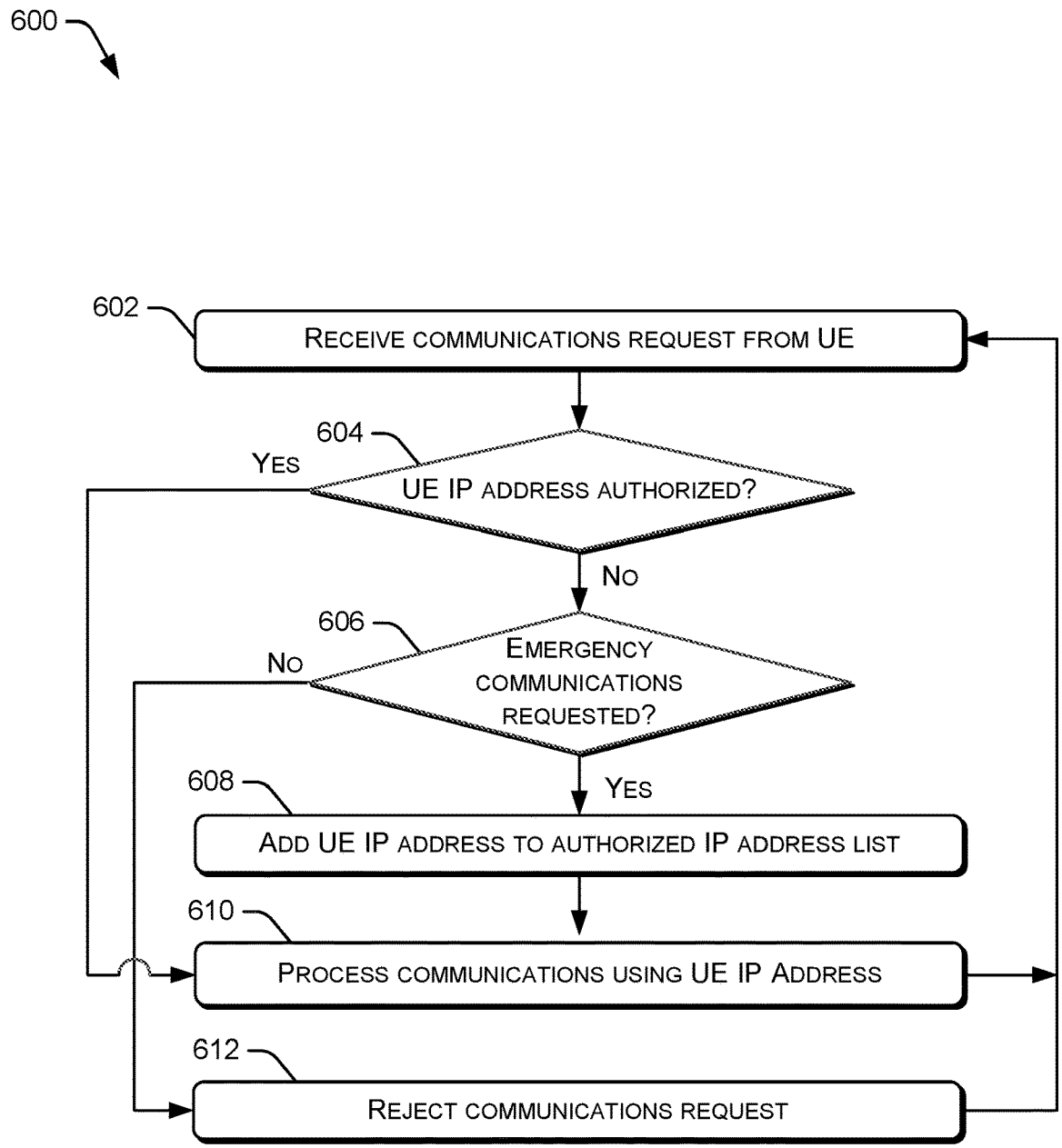
FIG. 6 is a flow diagram of another illustrative process for performing emergency communications management, in accordance with examples of the disclosure.

FIG. 6 shows a flow diagram of an illustrative process 600 for emergency communications management according to the disclosed embodiments. The process 600 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 600 may be described with reference to the wireless network environment 100 of FIG. 1, however, other environments may also be used.

At operation 602, a communications request may be received from a UE via a core network at an IMS network component, such as a P-CSCF. This communications request may be a request to establish a packet communication session between the UE and a destination system or components in the IMS network. The communications request may include an IP address (e.g., IPv4 or IPv6). Alternatively, the communications received at operation 602 may be any other type of packet-based communications that may use any other type of address. The communications received at operation 602 may further include an indication of a communications and/or communications session type.

At operation 604, the IMS network component may determine whether the IP address associated with the communications received at operation 602 is an authorized IP address. For example, the IMS network component may be configured with a set of authorized IP addresses. This set of authorized IP addresses may or may not correspond to a set of authorized IP addresses used at the core network to provide an IP address to the UE originating the communications received at operation 602. If the IP address is authorized, the process 600 may proceed to operation 610 where the IMS network component may process and/or route the communications normally (e.g., as normal user data, as emergency communications, etc.) using the IP address associated with the communications received at operation 602. The process 600 may return to operation 602 to process additional communications.

If, at operation 604, the IMS network component determines that the IP address associated with the communications received at operation 602 is not an authorized IP address, at operation 606 the IMS network component may determine whether the received communications is an emergency communications request or otherwise associated with an emergency (e.g., SOS, 911 call or text, etc.). If the communications is not an emergency communications, at operation 612 the request or communications may be rejected. For example, the packet may simply be dropped, a response with an error code may be generated and transmitted, etc. The process 600 may return to operation 602 to process additional communications.

However, if the IMS network component determines that the received communications is an emergency communications at operation 606, at operation 608 the IMS network component may update its set of authorized IP address to include the (formerly) unauthorized IP address associated with the request received at operation 602. In some examples, the IMS network component may further propagate this addition to the authorized IP addresses to one or more systems or components.

At operation 610, the IMS network component may process and/or route the communications normally (e.g., as normal user data, as emergency communications, etc.) using the IP address associated with the communications received at operation 602, which is now an authorized IP address due to the update performed at operation 608. Because the IP address is now authorized, the IMS network component may service further emergency communications associated with that IP address. For example, the IMS network component may receive packets or other communications from an E-CSCF destined for the now authorized IP address and forward the packets or other communications to the core network for routing to the UE. The IMS network component may also, or instead, use the normal process subsequent emergency communications using the now authorized IP address so that communications with emergency services providers may be facilitated. The process 600 may return to operation 602 to process additional communications.

Figure 7:
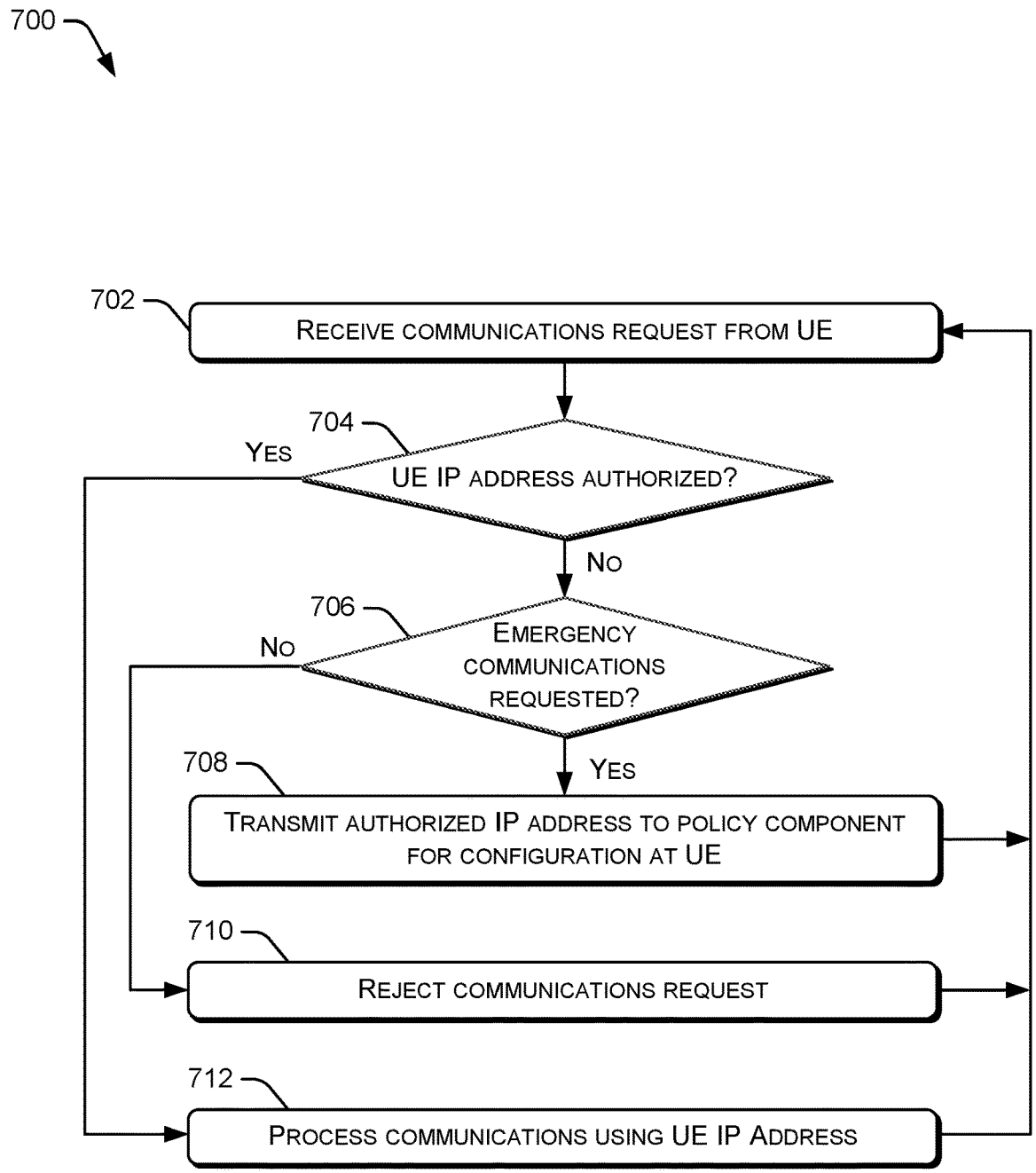
FIG. 7 is a flow diagram of another illustrative process for performing emergency communications management, in accordance with examples of the disclosure.

FIG. 7 shows a flow diagram of an illustrative process 700 for emergency communications management according to the disclosed embodiments. The process 700 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 700 may be described with reference to the wireless network environment 100 of FIG. 1, however, other environments may also be used.

At operation 702, a communications request may be received from a UE via a core network at an IMS network component, such as a P-CSCF. This communications request may be a request to establish a packet communication session between the UE and a destination system or components in the IMS network. The communications request may include an IP address (e.g., IPv4 or IPV6). Alternatively, the communications received at operation 702 may be any other type of packet-based communications that may use any other type of address. The communications received at operation 702 may further include an indication of a communications and/or communications session type.

At operation 704, the IMS network component may determine whether the IP address associated with the communications received at operation 702 is an authorized IP address. For example, the IMS network component may be configured with a set of authorized IP addresses. This set of authorized IP addresses may or may not correspond to a set of authorized IP addresses used at the core network to provide an IP address to the UE originating the communications received at operation 702. If the IP address is authorized, the process 700 may proceed to operation 712 where the IMS network component may process and/or route the communications normally (e.g., as normal user data, as emergency communications, etc.) using the IP address associated with the communications received at operation 702. The process 700 may return to operation 702 to process additional communications.

If, at operation 704, the IMS network component determines that the IP address associated with the communications received at operation 702 is not an authorized IP address, at operation 706 the IMS network component may determine whether the received communications is an emergency communications request or otherwise associated with an emergency (e.g., SOS, 911 call or text, etc.). If the communications is not an emergency communications, at operation 710 the request or communications may be rejected. For example, the packet may simply be dropped, a response with an error code may be generated and transmitted, etc. The process 700 may return to operation 702 to process additional communications.

However, if the IMS network component determines that the received communications is an emergency communications at operation 706, at operation 708 the IMS network component may determine an authorized IP address from its set of authorized IP address for use by the UE. The IMS network component may transmit this IP address, in examples with other data and/or instructions, to the core network for configuring the IP address at the UE. For example, the IMS network component may provide the determined authorized IP address to a core network policy component (e.g., PCF/PCRF 160) that may then provide the IP address a session management component (e.g., SMF/SGW-C/PGW-C 140) in the core network. The session management component may adjust the session configurations for the UE to use the IP address provided by the IMS network component at operation 708, including instructing the UE to use this alternative IP address and/or updating any one or more other components or systems with the new IP address. The process 700 may return to operation 702 to process additional communications.

The UE that initially transmitted the communications received at operation 702 may now retransmit the emergency communications using the IP address provided by the IMS network component at operation 708. Because that communications will be recognized by the IMS network component as using an authorized IP address, it may be processed normally (e.g. at operation 712). Similarly, responsive communications destined for the UE and subsequent communications from the UE using that address may be processed normally because they are associated with the authorized address provided at operation 708.

Note that any of the operations performed in the processes 500, 600, and 700 may be combined, along with any other operations of functions described herein, and may be performed in any order. Any other combinations and subsets of operations are contemplated as within the scope of the instant disclosure.

In summary, by more efficiently addressing authorized IP address mismatch in processing emergency communications in wireless and IMS networks, the disclosed systems and techniques may be able to increase the efficiency of usage of core network and IMS network resources and other wireless network resources and improve the performance of both the network and user devices, while facilitating communications with emergency services providers.

Example User Equipment

Figure 8:
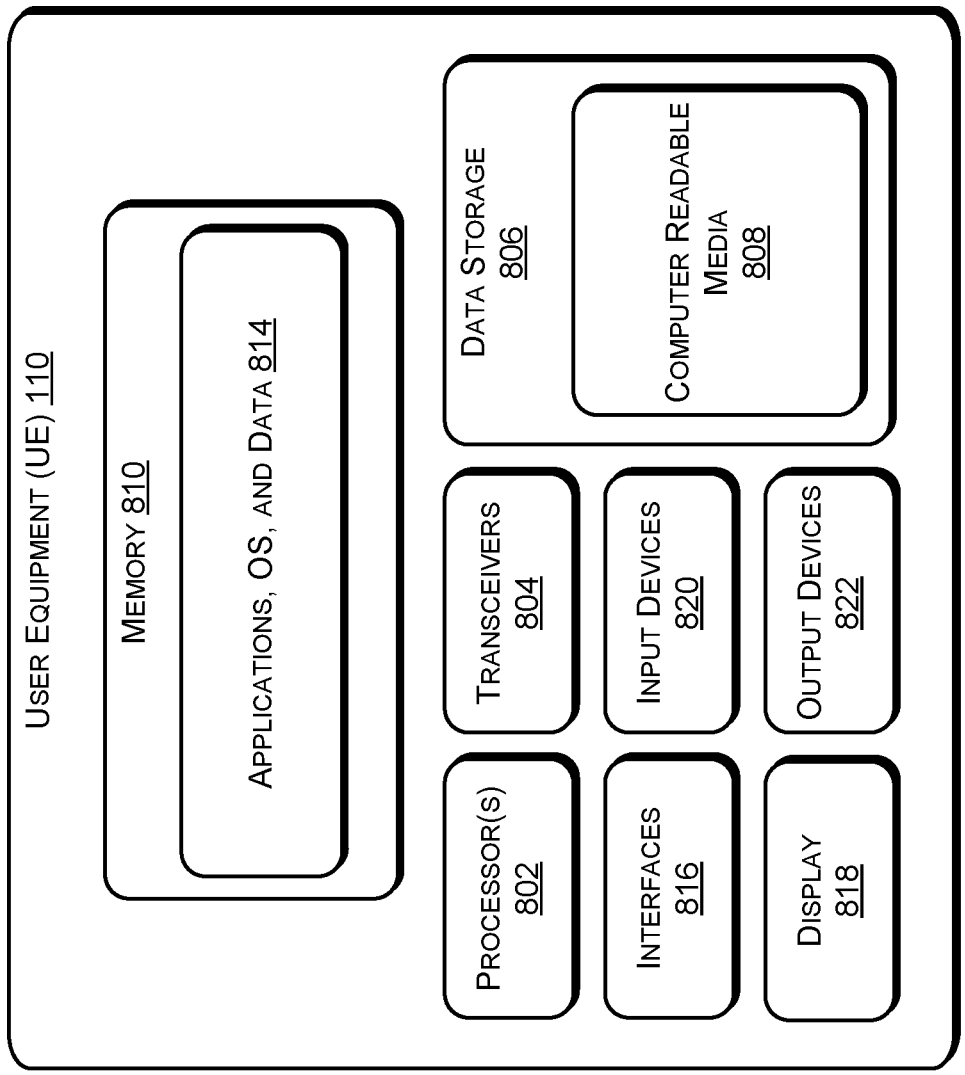
FIG. 8 is a schematic diagram of illustrative components in an example user device that is configured for interacting with a wireless communications network that implements emergency communications management, in accordance with examples of the disclosure.

FIG. 8 is an example of a UE, such as UE 110, for use with the systems and methods disclosed herein, in accordance with some examples of the present disclosure. The UE 110 may include one or more processors 802, one or more transmit/receive antennas (e.g., transceivers or transceiver antennas) 804, and a data storage 806. The data storage 806 may include a computer-readable media 808 in the form of memory and/or cache. This computer-readable media may include a non-transitory computer-readable media. The processor(s) 802 may be configured to execute instructions, which can be stored in the computer-readable media 808 and/or in other computer-readable media accessible to the processor(s) 802. In some configurations, the processor(s) 802 is a Central Processing Unit (CPU), a Graphics Processing Unit (GPU), or both CPU and GPU, or any other sort of processing unit. The transceiver antenna(s) 804 can exchange signals with a base station, such as base station 120.

The UE 110 may be configured with a memory 810. The memory 810 may be implemented within, or separate from, the data storage 806 and/or the computer-readable media 808. The memory 810 may include any available physical media accessible by a computing device to implement the instructions stored thereon. For example, the memory 810 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 110.

The memory 810 can store several modules, such as instructions, data stores, and so forth that are configured to execute on the processor(s) 802. In configurations, the memory 810 may also store one or more applications 814 configured to receive and/or provide voice, data, and messages (e.g., SMS messages, Multi-Media Message Service (MMS) messages, Instant Messaging (IM) messages, Enhanced Message Service (EMS) messages, etc.) to and/or from another device or component (e.g., the base station 120). The applications 814 may also include one or more operating systems and/or one or more third-party applications that provide additional functionality to the UE 110. The memory may also, or instead, store bandwidth information, such as UE-supported bands, bandwidth(s) and bandwidth parts, one or more IP addresses, indications of sets of IP addresses, as well as communications session information such as UE-specific carrier bandwidth(s). The memory may also, or instead, store permit list and/or block list information, PDN-Type information, session management component information, user plane component information, policy component information, etc.

Although not all illustrated in FIG. 8, the UE 110 may also comprise various other components, e.g., a battery, a charging unit, one or more network interfaces 816, an audio interface, a display 818, a keypad or keyboard, and one or more input devices 820, and one or more output devices 822.

Example Computing Device

Figure 9:
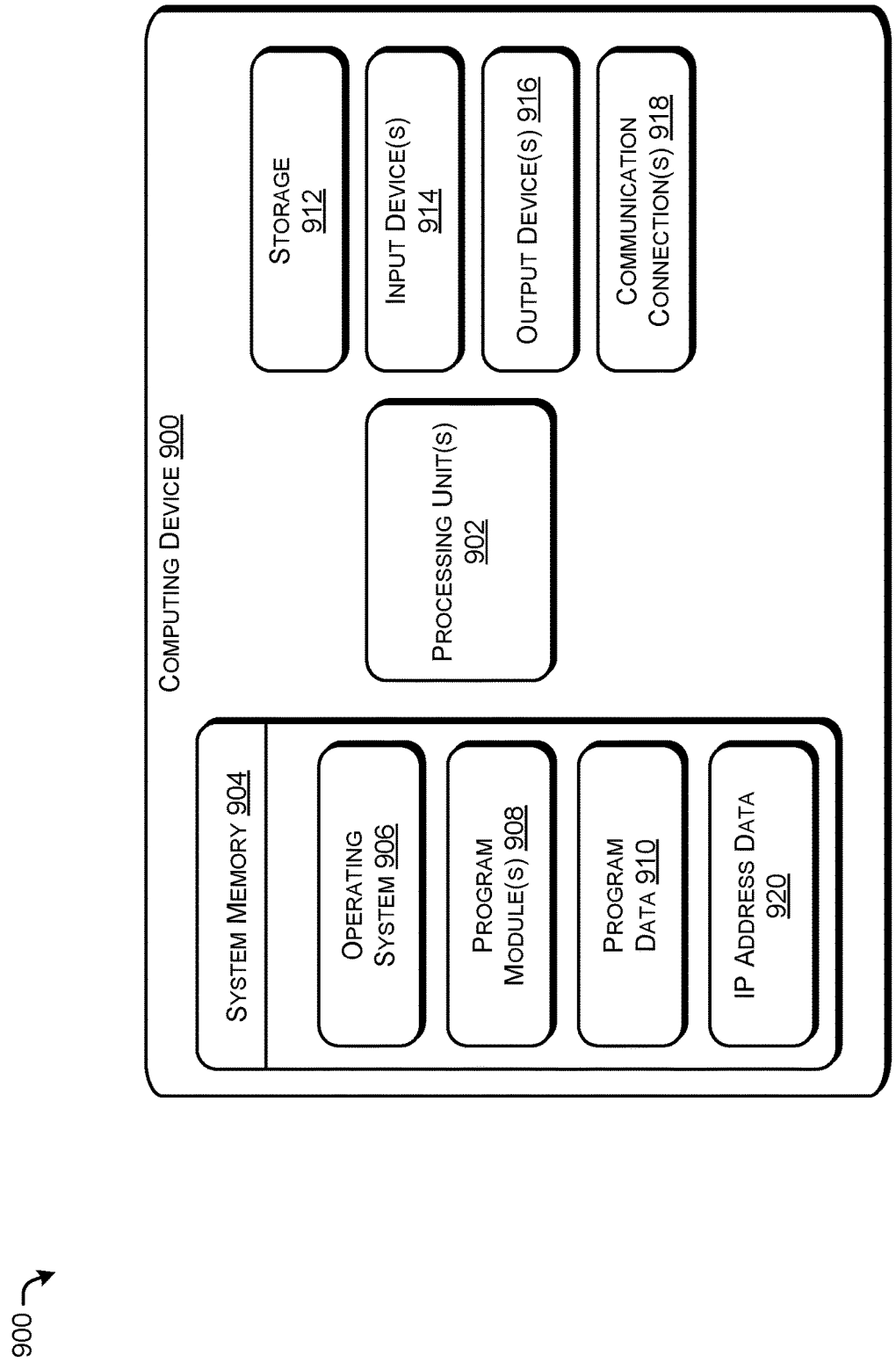
FIG. 9 is a schematic diagram of illustrative components in an example computing device that is configured for performing one or more aspects of emergency communications management, in accordance with examples of the disclosure.

FIG. 9 is an example of a computing device 900 for use with the systems and methods disclosed herein, in accordance with some examples of the present disclosure. The computing device 900 can be used to implement various components of a core network (e.g., base station 120, AMF/MME 130, SMF/SGW-C/PGW-C 140, UPF/SGW-U/PGW-U 150, PCF/PCRF 160, etc.), a base station, and/or any servers, routers, gateways, gateway elements, administrative components, IMS network components (e.g., P-CSCF 172, S-CSCF 174, E-CSCF 176, etc.), etc. that can be used by a communication provider.

In various embodiments, the computing device 900 can include one or more processing units 902 and system memory 904. Depending on the exact configuration and type of computing device, the system memory 904 can be volatile (such as RAM), non-volatile (such as ROM, flash memory, etc.) or some combination of the two. The system memory 904 can include an operating system 906, one or more program modules 908, program data 910, and IP address data 920 (e.g., configured IP address, authorized IP addresses, etc.). The system memory 904 may be secure storage or at least a portion of the system memory 904 can include secure storage. The secure storage can prevent unauthorized access to data stored in the secure storage. For example, data stored in the secure storage can be encrypted or accessed via a security key and/or password.

The computing device 900 can also include additional data storage devices (removable and/or non-removable) such as, for example, magnetic disks, optical disks, or tape. Such additional storage is illustrated in FIG. 9 by storage 912.

The computing device 900 may store, in either or both of the system memory 904 and the storage 912, IP addresses, IP address data, block list information, permit list information, associated functions, timer information and/or timestamps, message transfer data, PDU session information, session management data, etc.

Non-transitory computer storage media of the computing device 900 can include volatile and nonvolatile, removable and non-removable media implemented in any method or technology for storage of information, such as computer-readable instructions, data structures, program modules, or other data. The system memory 904 and storage 912 are examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 900. Any such non-transitory computer-readable storage media can be part of the computing device 900.

In various embodiments, any or all of the system memory 904 and storage 912 can store programming instructions which, when executed, implement some or all of the functionality described above as being implemented by one or more systems configured in the environment 100 and/or components of the core network 101 and/or the IMS network 170.

The computing device 900 can also have one or more input devices 914 such as a keyboard, a mouse, a touch-sensitive display, voice input device, etc. The computing device 900 can also have one or more output devices 916 such as a display, speakers, a printer, etc. can also be included. The computing device 900 can also contain one or more communication connections 918 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

- A: A method performed by a one or more computing devices configured in a wireless communications network, the method comprising: receiving, at an Internet protocol (IP) multimedia system (IMS) component from a user equipment (UE) via a core network associated with the IMS, a communications request comprising a source IP address associated with the UE and provided by a component of the core network; determining, by the IMS component, that the source IP address is not represented in a set of IP addresses configured at the IMS component and authorized to access an IMS associated with the IMS component; based at least in part on determining that the source IP address is not represented in the set of IP addresses, determining that a communications type for the communications request is an emergency communications type; based at least in part on determining that the communications type is the emergency communications type, adding the source IP address to the set of IP addresses; and based at least in part on adding the source IP address to the set of IP addresses, routing the communications request to an emergency IMS component.
- B: The method of paragraph A, further comprising: receiving, at the IMS component from a second UE via the core network, a second communications request comprising a second source IP address; determining, by the IMS component, that the second source IP address is not represented in the set of IP addresses; based at least in part on determining that the second source IP address is not represented in the set of IP addresses, determining that a second communications type for the second communications request is not the emergency communications type; and based at least in part on determining that the second communications type is not the emergency communications type, rejecting the second communications request.
- C: The method of paragraph A or B, wherein receiving the communications request comprises receiving the communications request from a user plane component configured at the core network.
- D: The method of any of paragraphs A-C, wherein the IMS component comprises a proxy call session control function (P-CSCF).
- E: The method of any of paragraphs A-D, wherein the emergency IMS component comprises an emergency call session control function (E-CSCF).
- F: The method of any of paragraphs A-E, further comprising: receiving, at the IMS component from a second IMS component, a second communications request comprising a destination IP address; determining, by the IMS component, that the destination IP address is represented in the set of IP addresses; and based at least in part on determining that the destination IP address is represented in the set of IP addresses, transmitting the second communications request to the core network.
- G: The method of paragraph F, wherein the destination IP address is the source IP address.
- H: The method of paragraph F, wherein the second IMS component is the emergency IMS component.
- I: A network computing device configured at a wireless communications network, the network computing device comprising: one or more processors; one or more transceivers; and non-transitory computer-readable media storing computer-executable instructions that, when executed by the one or more processors, cause the one or more processors to perform operations comprising: receiving, at an Internet protocol (IP) multimedia system (IMS) component, a first communications request comprising a source IP address assigned to a user equipment (UE) by a core network component; determining, by the IMS component, that the source IP address is not represented in a set of IP addresses configured at the IMS component for IMS access; based at least in part on determining that the source IP address is not represented in the set of IP addresses, determining that a communications type for the first communications request is an emergency communications type; and based at least in part on determining that the communications type is the emergency communications type: generating a mapping of the source IP address to an authorized IP address from the set of IP addresses; generating a second communications request based at least in part on the first communications request and comprising the authorized IP address; and routing the second communications request to an emergency IMS component.
- J: The network computing device of paragraph I, wherein: the first communications request comprises a first request to establish packet-based communications between the emergency IMS component and the source IP address; and the second communications request comprises a second request to establish packet-based communications between the emergency IMS component and the authorized IP address.
- K: The network computing device of paragraph I or J, wherein the operations further comprise: receiving, at the IMS component from a second IMS component, a third communications request comprising a destination IP address; determining, by the IMS component, that the destination IP address is the authorized IP address mapped to the source IP address; based at least in part on determining that the destination IP address is the authorized IP address mapped to the source IP address, generating a fourth communications request based at least in part on the third communications request and comprising the source IP address; and transmitting the fourth communications request to the UE via the core network.

L: The network computing device of paragraph K, wherein the second IMS component is the emergency IMS component.

M: The network computing device of any of paragraphs I-L, wherein the operations further comprise: receiving, at the IMS component, a third communications request comprising the source IP address; determining that a second communications type for the third communications request is not the emergency communications type; and based at least in part on determining that the second communications type is not the emergency communications type, rejecting the third communications request.

N: The network computing device of any of paragraphs I-M, wherein the operations further comprise removing the mapping of the source IP address to the authorized IP address after a period of time following generation of the mapping of the source IP address to the authorized IP address.

O: A non-transitory computer-readable media storing computer-executable instructions that, when executed by one or more processors, cause the one or more processors to perform operations comprising: receiving, at an Internet protocol (IP) multimedia system (IMS) component, a communications request comprising a source IP address assigned to a user equipment (UE) by a first core network component; determining, by the IMS component, that the source IP address is not represented in a set of IP addresses configured at the IMS component for IMS access; based at least in part on determining that the source IP address is not represented in the set of IP addresses, determining that a communications type for the communications request is an emergency communications type; based at least in part on determining that the communications type is the emergency communications type, determining an authorized IP address from the set of IP addresses; and transmitting the authorized IP address to a second core network component for configuration of the authorized IP address at the UE.

P: The non-transitory computer-readable media of paragraph O, wherein: the first core network component comprises a user plane component; and the second core network component comprises a policy component.

Q: The non-transitory computer-readable media of paragraph O or P, wherein the operations further comprise: receiving, at the IMS component, a second communications request comprising the authorized IP address assigned to the UE by a third core network component; determining, by the IMS component, that the authorized IP address is represented in the set of IP addresses; and based at least in part on determining that the source IP address is represented in the set of IP addresses, routing the second communications request to a second IMS component.

R: The non-transitory computer-readable media of paragraph Q, wherein the second IMS component comprises an emergency IMS component.

S: The non-transitory computer-readable media of paragraph Q, wherein the third core network component comprises a session management component.

T: The non-transitory computer-readable media of any of paragraphs O-S, wherein the operations further comprise: receiving, at the IMS component, a second communications request comprising the source IP address; determining that a second communications type for the second communications request is not the emergency communications type; and based at least in part on determining that the second communications type is not the emergency communications type, rejecting the second communications request.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A-T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a one or more computing devices configured in a wireless communications network, the method comprising:
    receiving, at an Internet protocol (IP) multimedia system (IMS) component from a user equipment (UE) via a core network associated with the IMS, a communications request comprising a source IP address associated with the UE and provided by a component of the core network;
    determining, by the IMS component, that the source IP address is not represented in a set of IP addresses configured at the IMS component and authorized to access an IMS associated with the IMS component;
    based at least in part on determining that the source IP address is not represented in the set of IP addresses, determining that a communications type for the communications request is an emergency communications type;
    based at least in part on determining that the communications type is the emergency communications type, adding the source IP address to the set of IP addresses; and
    based at least in part on adding the source IP address to the set of IP addresses, routing the communications request to an emergency IMS component.

2. The method of claim 1, further comprising:
    receiving, at the IMS component from a second UE via the core network, a second communications request comprising a second source IP address;
    determining, by the IMS component, that the second source IP address is not represented in the set of IP addresses;
    based at least in part on determining that the second source IP address is not represented in the set of IP addresses, determining that a second communications type for the second communications request is not the emergency communications type; and
    based at least in part on determining that the second communications type is not the emergency communications type, rejecting the second communications request.

3. The method of claim 1, wherein receiving the communications request comprises receiving the communications request from a user plane component configured at the core network.

4. The method of claim 1, wherein the IMS component comprises a proxy call session control function (P-CSCF).

5. The method of claim 1, wherein the emergency IMS component comprises an emergency call session control function (E-CSCF).

6. The method of claim 1, further comprising:
    receiving, at the IMS component from a second IMS component, a second communications request comprising a destination IP address;
    determining, by the IMS component, that the destination IP address is represented in the set of IP addresses; and
    based at least in part on determining that the destination IP address is represented in the set of IP addresses, transmitting the second communications request to the core network.

7. The method of claim 6, wherein the destination IP address is the source IP address.

8. The method of claim 6, wherein the second IMS component is the emergency IMS component.

* * * * *